Figure 1:
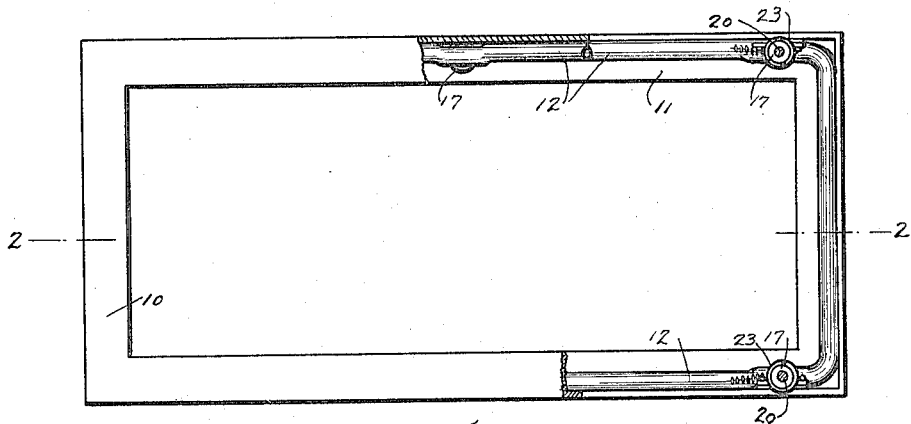

T. L. WITKOP.
SHOCK ABSORBER.
APPLICATION FILED JULY 16, 1914.

1,145,732.

Patented July 6, 1915.

2 SHEETS—SHEET 1.

WITNESSES:

INVENTOR
Theodore L. Witkop
BY
ATTORNEY

T. L. WITKOP.
SHOCK ABSORBER.
APPLICATION FILED JULY 16, 1914.

1,145,732.

Patented July 6, 1915.
2 SHEETS—SHEET 2.

WITNESSES:
Walter H. Kelley
Clara Bowers

INVENTOR
Theodore L. Witkop
BY
J. Wm Ellis
ATTORNEY

UNITED STATES PATENT OFFICE.

THEODORE L. WITKOP, OF BUFFALO, NEW YORK.

SHOCK-ABSORBER.

1,145,732.   Specification of Letters Patent.   Patented July 6, 1915.

Application filed July 16, 1914. Serial No. 851,277.

*To all whom it may concern:*

Be it known that I, THEODORE L. WITKOP, a citizen of the United States of America, residing in Buffalo, county of Erie, and State of New York, have invented certain new and useful Improvements in Shock-Absorbers, of which the following is a full, clear, and exact description.

My invention relates generally to shock absorbers, and more particularly to vehicle shock absorbers which are designed to be placed between the body of the vehicle chassis, or between the chassis and the axis of the vehicle.

The general object of my invention has been to provide a device in which pneumatic means shall be employed, whereby the shock or jolts caused by the vehicle passing over rough roads may be substantially eliminated. Moreover, with the use of my device, hard tires may be used in place of the pneumatic tires, and furthermore my device is such that, if desired, the springs of the vehicle may be dispensed with.

I have not shown my absorber attached to any part of a vehicle, but it is obvious that the angle iron frames of the same may be attached in any desired position so that the device will absorb the shock given to the body of the vehicle.

I have accomplished the above objects and advantages by the device shown in the accompanying drawings, which form part of this specification.

Figure 2:
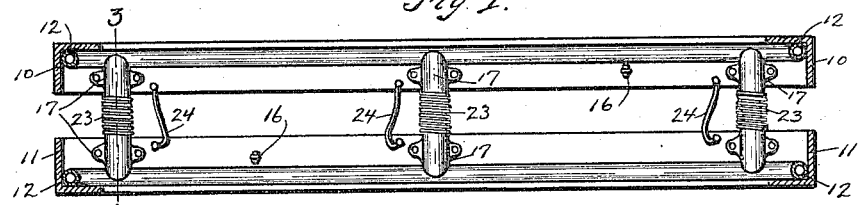
Figures 3, 4:
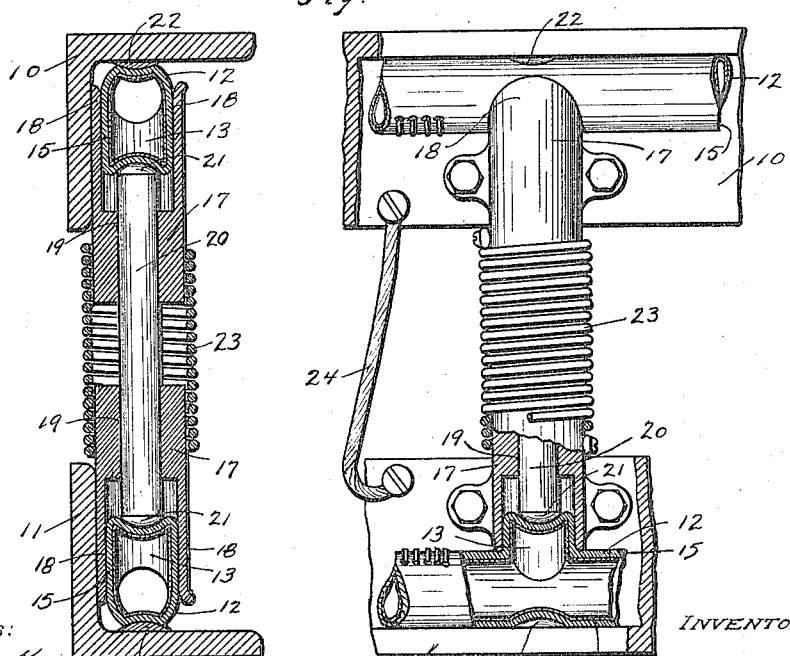
Figure 5:
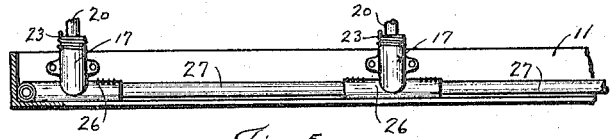
Figure 6:
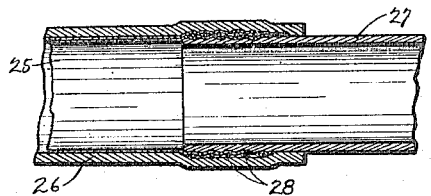
Figure 7:
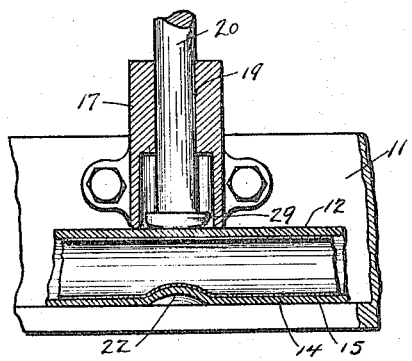
Figure 8:
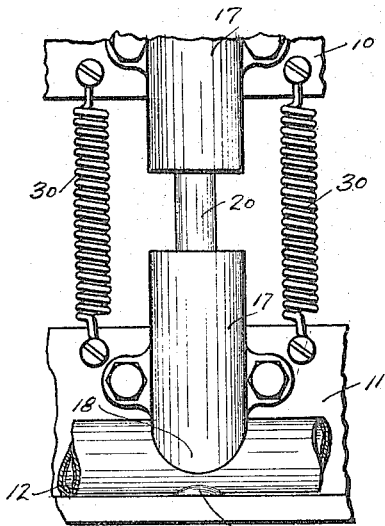

In the drawings, like figures of reference indicate like parts throughout the several views, of which:

Figure 1 is a plan view of my device with a portion thereof broken away. Fig. 2 is a longitudinal sectional elevation of the same taken on line 2—2 of Fig. 1. Fig. 3 is an enlarged sectional elevation of one of the shock absorbing units and is taken on line 3—3 of Fig. 2. Fig. 4 is an enlarged front elevation of one of the shock absorbing units with a portion thereof in section. Fig. 5 is a fragmentary sectional view of my device showing a modified form of air chamber. Fig. 6 is an enlarged fragmentary sectional view of one of the connections in the modified form shown in Fig. 5. Fig. 7 is a fragmentary sectional view of a modified form of one of the shock absorbing units. Fig. 8 is a fragmentary front elevation of a modified form of spring retaining means.

My device comprises an upper angle iron frame 10 and a lower angle iron frame 11, which are secured to the parts of the vehicle to which my device is to be attached. Preferably extending around the inner corner of each of these angle iron frames is an air chamber 12, which is provided at suitable intervals with projecting air cushions 13. Each of these air chambers is preferably made continuous and is of the usual tire construction, comprising an inner tube 14 and an outer casing 15. Each of the inner tubes is provided with a suitable air valve 16, whereby the same may be inflated with air under suitable pressure. The air cushions 13 on the upper and lower air chambers point toward each other and are disposed in a straight vertical line.

17 are air cushion cylinders, which are arranged so that the inner end of each will be disposed around one of the air cushions 13, and thus form a casing for the same, whereby the air cushion is protected from injury and from undue expansion when the device is operated. Each of these cylinders is provided preferably at its inner end with oppositely arranged lips 18, which extend partly over the air chambers 12 and thus act to more securely retain the air cushions in place. Each of the air cylinders 17 is provided with a reduced bore 19 in its bearing end, and a plunger 20 has its ends disposed in two opposed cylinders. The bore in part of the cylinder 17, which incases the air cushion, is larger than the diameter of the piston 20 so that the material in the cushion will not be pinched when the piston or plunger descends. The plunger 20 is provided at each end with a resilient shoe 21, which prevents the plunger from cutting into or injuring the air cushions 13. Secured to the horizontal leg of the angle iron and arranged beneath the air cushion 12, and in line with the plunger 20, is a resilient bumper 22. Should the pressure in the air cushion accidentally fail, the plungers descend until they force the upper portion of the air cushions down against this bumper, which would act not only to temporarily absorb the shock, but also to prevent injury to the air cushions or air chamber.

To the outer end of each of the cylinders of each pair is secured one end of a helical spring 23. When the frames 10 and 11 are being separated from the rebound of the absorber, these springs 23 will be placed under tension and aid in restraining and checking the movement of the frames. Arranged preferably near each of the shock absorbing units is a stop 24, which may be provided by using a wire rope, chain or other suitable means. This stop prevents the frames from separating beyond a predetermined point.

In the modified form of my invention shown in Figs. 5 and 6, the air chambers are shown as being formed of a short rubber inner tube 25 and casing 26 at each of the cylinders 17; these inner tubes being connected to a metallic tube 27. Any suitable means may be employed for connecting the ends of the inner tubes and casings with the ends of the metallic tubes. In the drawing, I have shown one of the many ways of making this connection. As shown, the end of the tube is provided with corrugations extending around the same and the end of the inner tube is disposed over these corrugations and properly cemented and secured thereto by wire bands 28, extending around the same. The casing 26 is preferably secured over the inner tube and the end of the metallic tube by suitable lacing.

In Fig. 7, I show a form of my invention where I dispense with the use of the air cushions 13. In this form, the plunger 20 is preferably provided at its lower end with an enlarged shoe 29, which bears directly on the upper surface of the air chamber 12.

In Fig. 8, I have shown a modified form of spring retaining means. In this form, I preferably provide two helical springs 30 at each of the shock absorbing units. These springs have their ends secured to each of the angle iron frames 10 and 11.

From the foregoing description it will be clearly seen that when my device is attached to a vehicle and the frames 10 and 11 tend to approach each other, due to a sudden jolt or a rough road, the plungers or pistons 20 will be forced down into the cylinders and will thus bear against the upper ends of the air cushions 13, thereby compressing the air therein and thus resisting the shock.

It will be seen that the cylinder, through which the plunger 20 slides, is of considerable length, and as the cylinders are rigidly secured to the frames 10 and 11, these plungers also act to prevent relative lateral motion of the frames.

While I have shown the air chambers in my device in the form of one endless tubing, it is obvious, that if desired, these air chambers may be made in sections, one section for each shock absorbing unit, and each section provided with a separate air valve. These and many other modifications of the details herein shown and described may be made without departing from the spirit of my invention or the scope of the appended claims, and I do not wish to be limited to the exact embodiment herein shown and described.

Having thus described my invention, what I claim is:

1. A shock absorber comprising an upper frame, a lower frame, a resilient air chamber secured to each of said frames, and slidably mounted plungers carried by said frames and bearing against said air chambers.

2. A shock absorber comprising an upper frame, a lower frame, a resilient air chamber secured to each of said frames, slidably mounted plungers carried by said frames and bearing against said air chambers, a resilient shoe carried at each end of each of said plungers, and resilient bumpers carried by said frames, said bumpers being disposed beneath each of said air chambers and in line with each of said plungers.

3. A shock absorber comprising an upper frame, a lower frame, a resilient air chamber secured to each of said frames, cylinders carried by each frame, plungers slidably mounted in said cylinders and bearing against said air chambers.

4. A shock absorber comprising an upper frame, a lower frame, a resilient air chamber secured to each of said frames, each of said air chambers being provided with air cushions, cylinders carried by each of said frames and incasing said air cushions, and plungers slidably mounted in said cylinders and bearing against said air cushions.

5. A shock absorber comprising an upper frame, a lower frame, a resilient air chamber secured to each of said frames, each of said air chambers being provided with air cushions, cylinders carried by each of said frames and incasing said air cushions, and plungers slidably mounted in said cylinders and bearing against said air cushions, said cylinders having a bore around said air cushions, which is larger in diameter than the diameter of said plungers.

In testimony whereof, I have hereunto signed my name in the presence of two subscribing witnesses.

THEODORE L. WITKOP.

Witnesses:
J. WM. ELLIS,
WALTER H. KELLEY.

Copies of this patent may be obtained for five cents each, by addressing the "Commissioner of Patents, Washington, D. C."